(12) United States Patent
Liu

(10) Patent No.: US 7,787,244 B1
(45) Date of Patent: Aug. 31, 2010

(54) HARD DISK ADAPTER

(75) Inventor: Han Liu, Fremont, CA (US)

(73) Assignee: Antec, Inc., Fremont, CA (US)

( * ) Notice: Subject to any disclaimer, the term of this patent is extended or adjusted under 35 U.S.C. 154(b) by 0 days.

(21) Appl. No.: 12/499,062

(22) Filed: Jul. 7, 2009

(51) Int. Cl.
*H05K 5/00* (2006.01)
*A47B 97/00* (2006.01)
*G11B 5/012* (2006.01)

(52) U.S. Cl. .............. 361/679.33; 312/223.1; 312/223.2; 361/679.37; 361/679.39; 360/97.01

(58) Field of Classification Search ............... 361/679.31–679.45, 679.55, 679.58, 724–727, 361/683, 684, 685, 686; 312/223.1, 223.2, 312/331; 211/26; 439/157, 60, 152–153, 439/327, 328, 331
See application file for complete search history.

(56) References Cited

U.S. PATENT DOCUMENTS

| 6,129,430 | A | * | 10/2000 | Wu | 312/223.2 |
| 6,515,854 | B1 | * | 2/2003 | Claprood | 361/679.33 |
| 2007/0253671 | A1 | * | 11/2007 | McCormack et al. | 385/135 |

* cited by examiner

*Primary Examiner*—Zachary M Pape
*Assistant Examiner*—Jerry Wu
(74) *Attorney, Agent, or Firm*—Muncy, Geissler, Olds & Lowe, PLLC

(57) ABSTRACT

A hard disk adapter has a body, a connector, an opening, a plug-in slot and an eSATA connector. The body has a panel and a receiving space. The connector is attached to the body and located in the receiving space. The opening is formed on the panel and communicates with the receiving space. The plug-in slot is formed on the panel beside the opening. The eSATA connector has a receiving end mounted to the plug-in slot.

8 Claims, 5 Drawing Sheets

HARD DISK ADAPTER

BACKGROUND OF THE INVENTION

1. Field of the Invention

The present invention relates to an adapter, especially to a hard disk adapter for use with a hard disk.

2. Description of the Prior Art

A conventional hard disk adapter comprises a body in which a receiving space is formed. The body has a connector for connecting a hard disk to a motherboard or an interface card. However, when in need of using an eSATA peripheral such as another hard disk or a CD-ROM drive, the eSATA can only be connected to the motherboard or the interface card, which is extremely inconvenient.

To overcome the shortcomings, the present invention provides a hard disk adapter to mitigate or obviate the aforementioned problems.

SUMMARY OF THE INVENTION

The main objective of the invention is to provide a hard disk adapter.

The hard disk adapter in accordance with the present invention has a body, a connector, an opening, a plug-in slot and an eSATA connector.

The body has a panel and a receiving space. The connector is attached to the body and located in the receiving space. The opening is formed on the panel and communicates with the receiving space. The plug-in slot is formed on the panel beside the opening. The eSATA connector has a receiving end mounted to the plug-in slot.

With the above-described structure, the hard disk adapter is capable of conveniently connecting a hard disk and providing an available connection for an eSATA peripheral.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
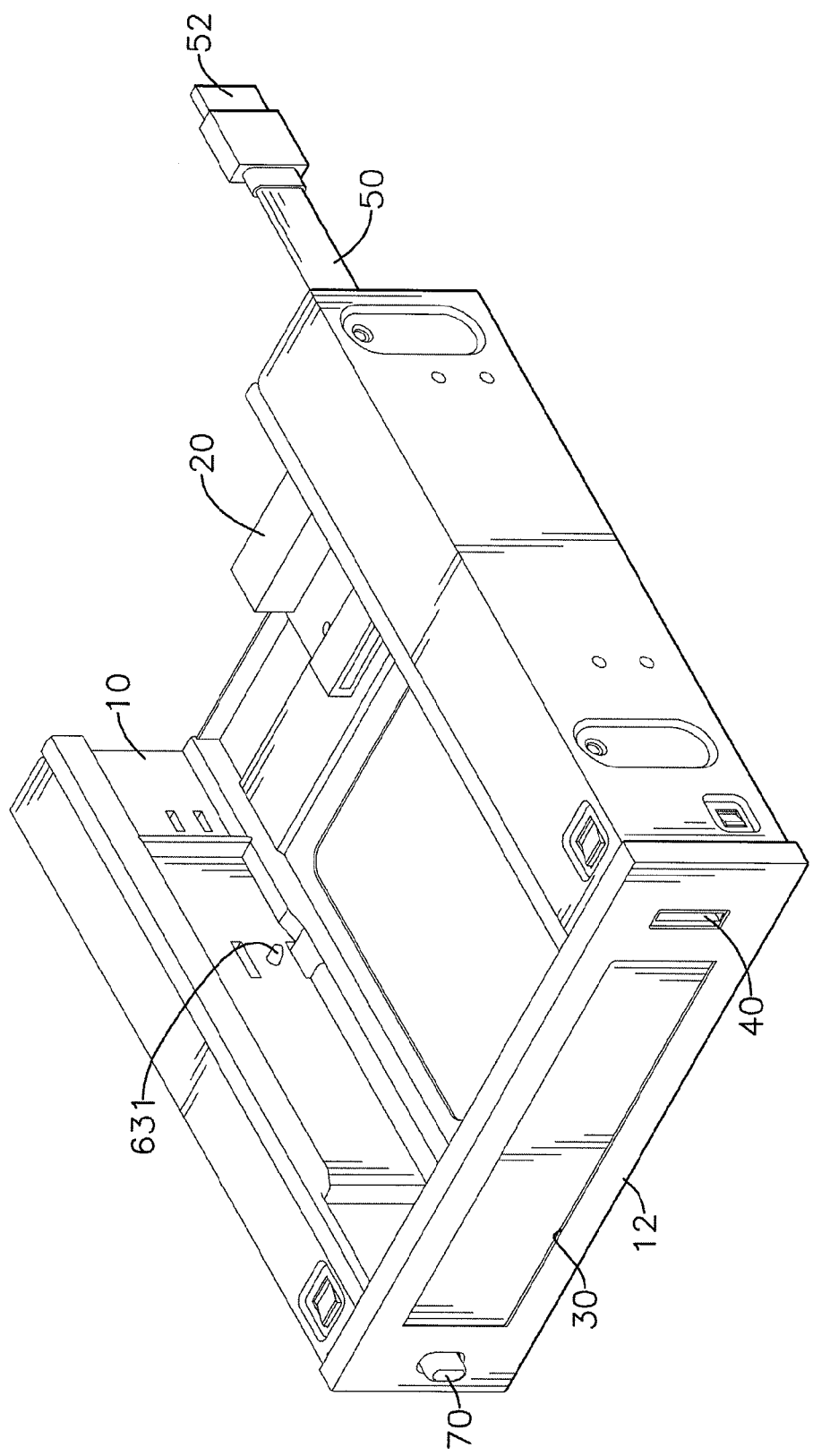
FIG. 1 is a perspective view of a hard disk adapter in accordance with the present invention.
Figure 2:
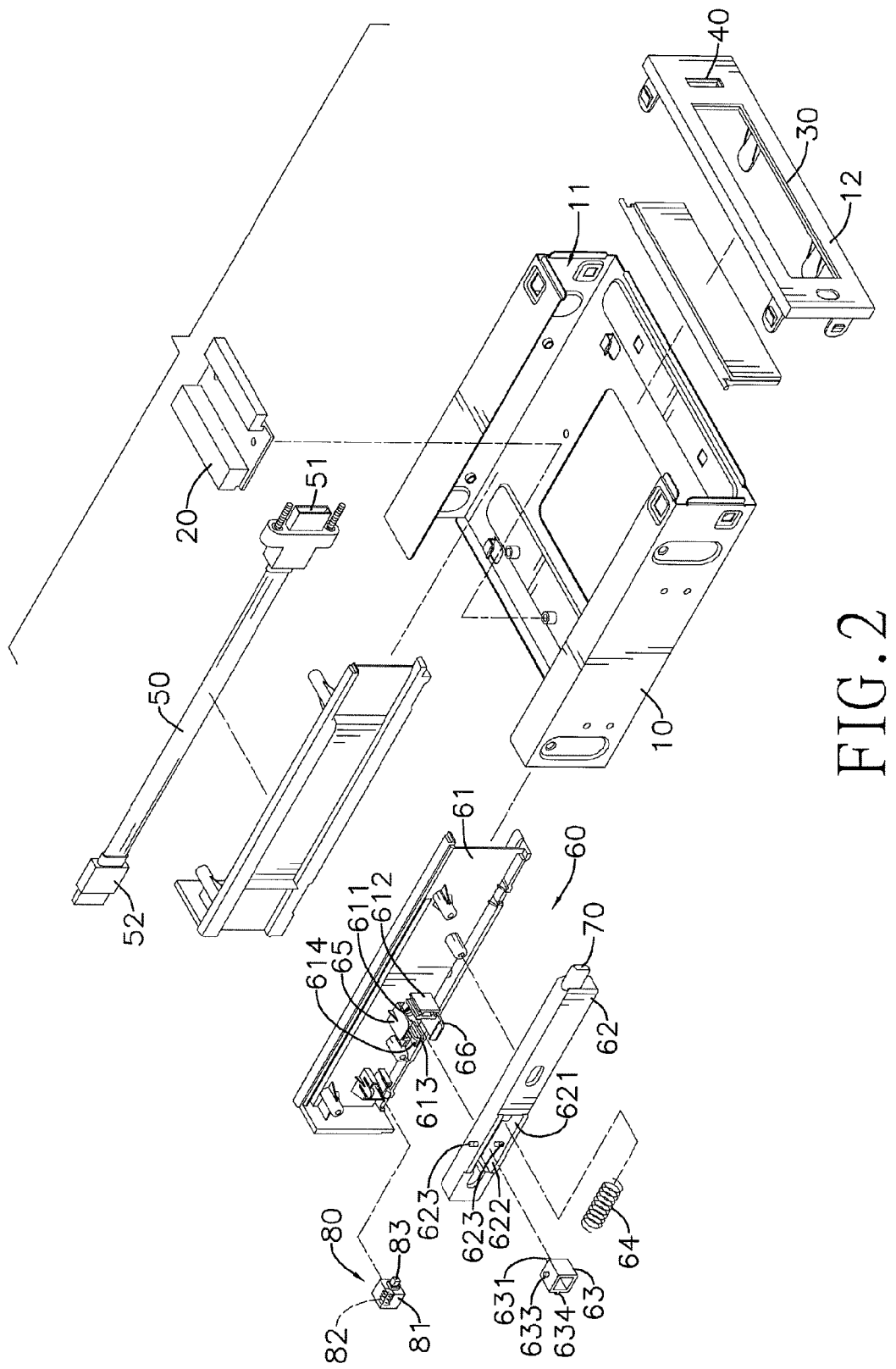
FIG. 2 is an exploded perspective view of the hard disk adapter in FIG. 1.
Figure 3:
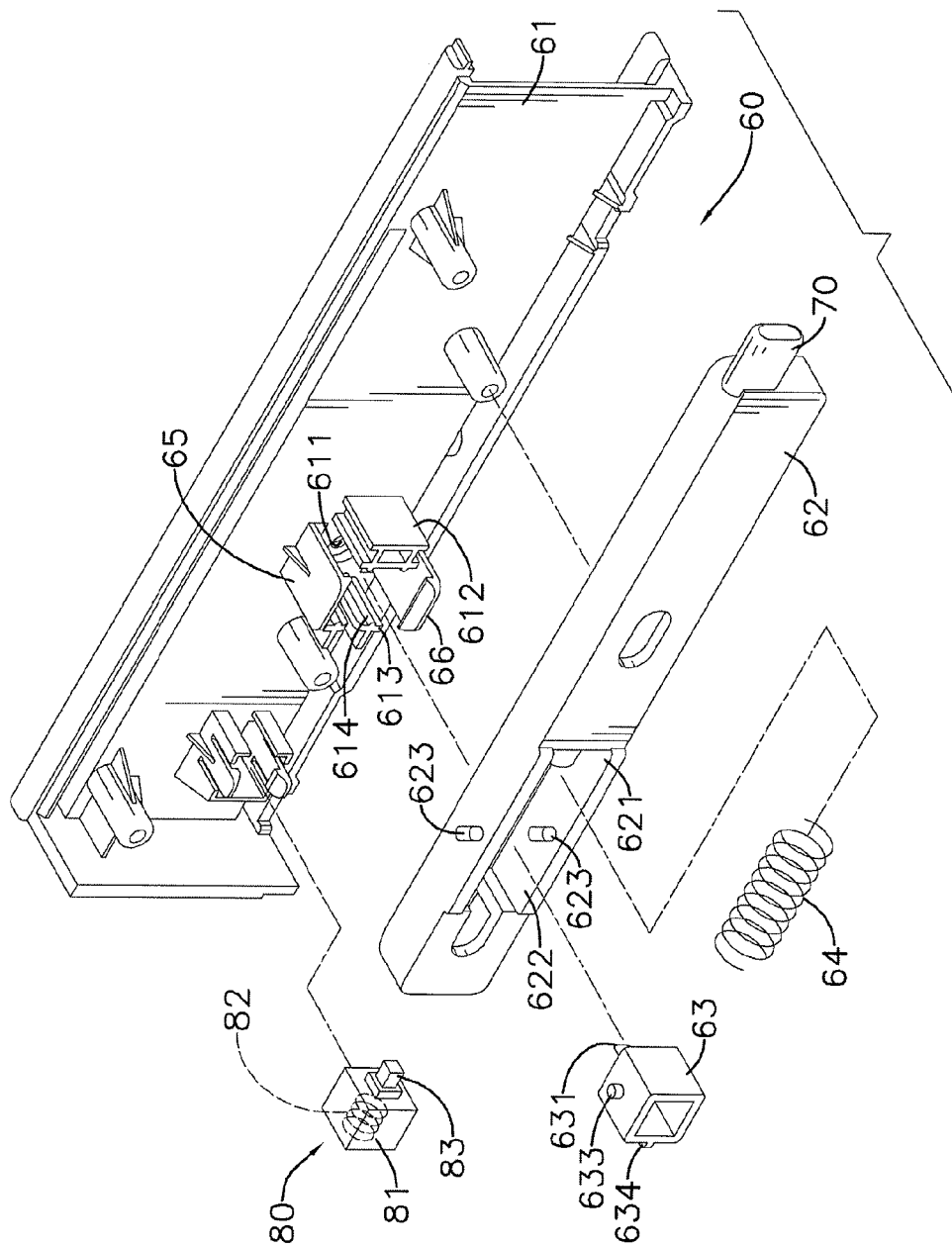
FIG. 3 is a partial exploded perspective view of the hard disk adapter in FIG. 1.

With reference to FIGS. 1-3, a hard disk adapter in accordance with the present invention comprises a body (10), a connector (20), an opening (30), a plug-in slot (40) and an eSATA connector (50).

The body (10) comprises a panel (12) and a receiving space (11). The panel (12) allows easy access to the hard disk adapter in accordance with the present invention.

The connector (20) is attached to the body (10) and located in the receiving space (11) for connecting a hard disk received in the receiving space (11) to a processing unit of a motherboard or that of an interface card. The means for connecting the hard disk and such a processing unit is well known and the description thereof is omitted in this specification.

The opening (30) is formed on the panel (12), communicates with the receiving space (11) and allowing a hard disk to be inserted therethrough into the receiving space (11).

The plug-in slot (40) is formed on the panel (12) beside the opening (30).

The eSATA connector (50), which may be an eSATA cable, comprises a receiving end (51) mounted to the plug-in slot (40) and a connecting end (52). The eSATA connector (50) connects an eSATA peripheral to an eSATA processing unit allowing information exchanging and signal processing therebetween. The eSATA peripheral is plugged to the plug-in slot (40) and connected to the receiving end (51) of the eSATA connector (50), while the eSATA processing unit is connected to the connecting end (52) of the eSATA connector.

For easy mounting and removing the hard disk, the hard disk adapter may further comprise a fastening device (60) and a switch (70). The fastening device (60) is attached to the body (10) for fastening the hard disk in the receiving space (11). The switch (70) is operably mounted on the panel (12) for controlling the fastening device (60).

Figure 4:
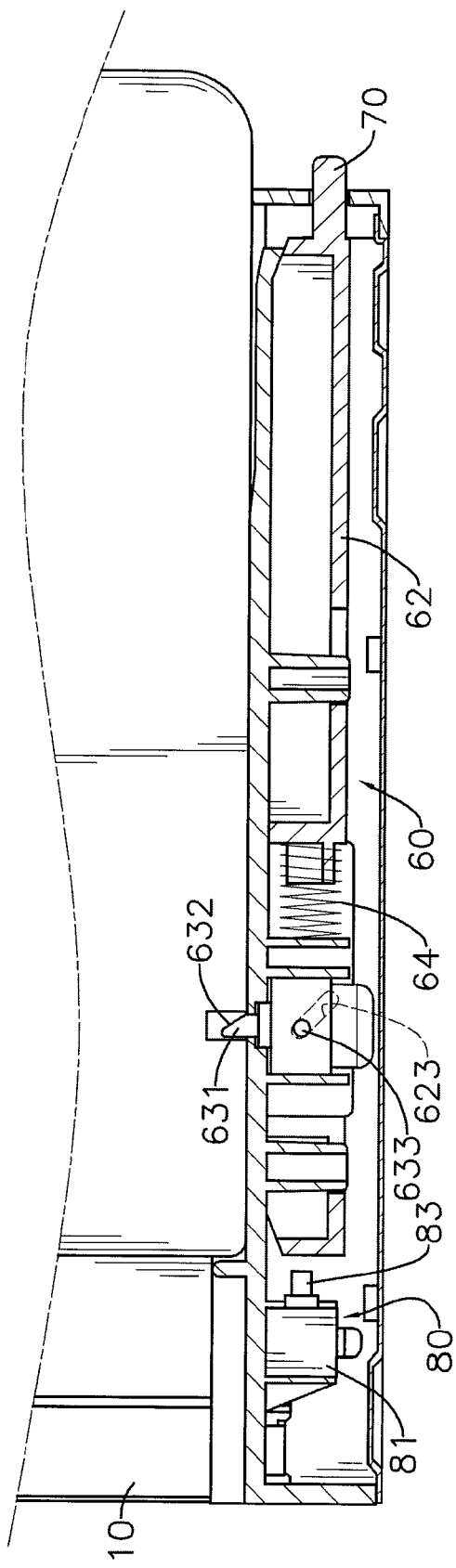
FIG. 4 is a top view in partial section of the hard disk adapter in FIG. 1, wherein the fastening protrusion protrudes into the receiving space.
Figure 5:
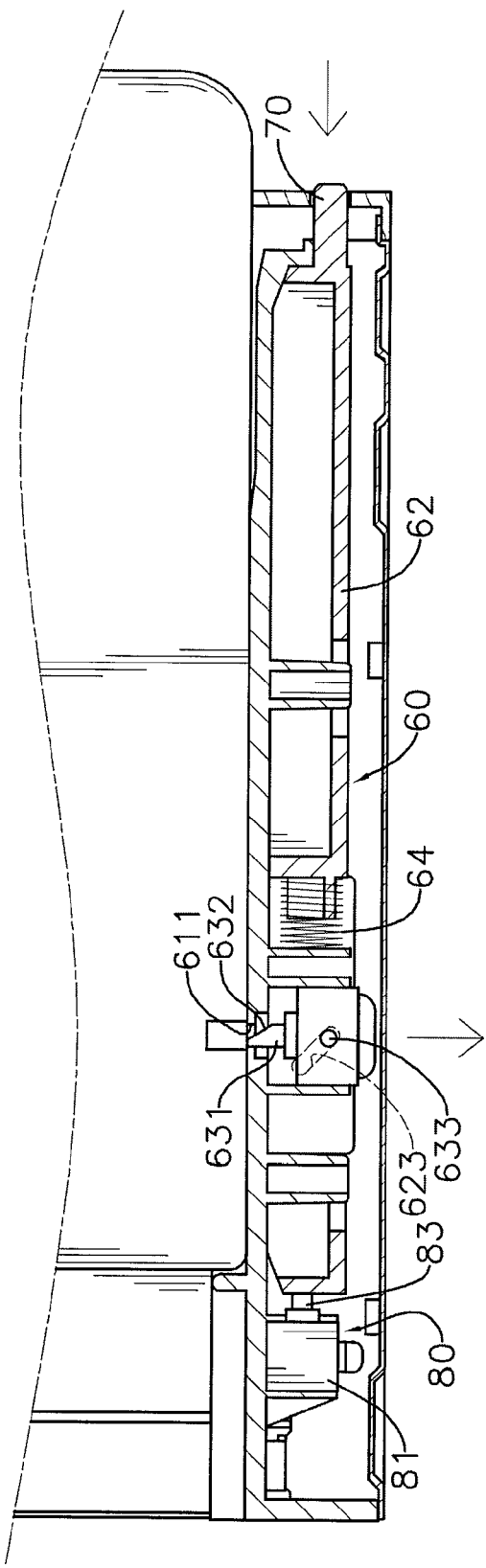
FIG. 5 is a top view in partial section of the hard disk adapter in FIG. 1, wherein the fastening protrusion retracts from the receiving space.

With reference to FIGS. 4 and 5, the fastening device (60) may comprise a holder (61), a slider (62) and a fastening member (63).

The holder (61) comprises a fore end, a rear end, a top edge, a bottom edge, an external surface and an internal surface, wherein the fore end points to the panel (12), the rear end points away from the panel (12) and the internal surface faces the receiving space (11). The holder (61) further has a fastening hole (611), a fore stop (612) and a rear stop (613). The fastening hole (611) communicates with the receiving space (11) and is formed on the holder (61). The fore stop (612) is attached to the external surface of the holder (61) ahead the fastening hole (611). The rear stop (613) is attached to the external surface of the holder (61) behind the fastening hole (611).

The slider (62) is mounted to the external surface of the holder (61). The slider (62) is capable of sliding in a back-and-forth direction and has a mounting slot (621) and at least one oblique slot (623). The mounting slot (621) is mounted around the fore stop (612) and the rear stop (613), is formed in the slider (62) and comprises a slot wall (622). The at least one oblique slot (623) is located between the fore stop (612) and the rear stop (613) and is formed in the slot wall (622) of the mounting slot (621) along a direction of rear-internal to fore-external. In a preferred embodiment, two oblique slots (623) align with each other are respectively formed on an upper side and a lower side of the slot wall (622).

The fastening member (63) is in-and-out slidably mounted between the fore stop (612) and the rear stop (613) and comprises an inner surface, a fastening protrusion (631), a fastening slope (632) and at least one cylinder (633). The inner surface faces the fastening hole (611). The fastening protrusion (631) is attached to the inner surface of the fastening member (63) and selectively inserted in the fastening hole (611) from the external surface to the internal surface of the holder (61) and comprises a distal end. The fastening slope (632) is formed on the distal end of the fastening protrusion (631) and faces the opening (30).

When a hard disk is inserted through the opening (30) into the receiving space (11), the hard disk presses against the fastening slope (632) and thus forces the fastening protrusion (631) to retract into the fastening hole (611) from the receiving space (11). When the hard disk reaches a position allowing a threaded hole of the hard disk to align with the fastening hole (611), the fastening protrusion (631) protrudes from the fastening hole (611) into the threaded hole to hold the hard disk in the receiving space (11).

The at least one cylinder (633) is formed on the fastening member (63). The at least one cylinder (633) is slidably mounted in the at least one oblique slot (623) respectively. When two oblique slots (623) are respectively formed in the upper side and lower side of the slot wall (622) as described above, it is preferred that two cylinders (633) are formed on the fastening member (63) and respectively mounted in the two oblique slots (623).

The switch (70) is a button extending from the slider (62) and protruding forwards from the panel (12) operably defined on the panel (12) for controlling the fastening device (60). To remove the hard disk from the receiving space (11), the switch (70) is pressed and the slider (62) is forced to slide rearwards. The at least cylinder (633) then slides outwards along the at least one oblique slot (623) so that the fastening protrusion (631) retracts from the threaded hole of the hard disk and make the hard disk removable.

For more convenient operation, the fastening device (60) further comprises a resilient element (64) pushing the slider (62) forwards and mounted between the fore stop (612) and the slot wall (622) of the mounting slot (621). The resilient element (64) may be a spring. Pushed by the resilient element (64), the slider (62) tend to slide forwards. Thus the at least one cylinder (633) tends to slide inwards along the at least one oblique slot (623). As a result, the fastening protrusion (631) is constantly inserted in the thread hole of the hard disk to hole the hard disk in the receiving space (11). In another aspect of the function of the resilient element (64), when the hard disk is removed, the resilient element (64) pushes the slider (62) forwards and allows the switch (70) to return to a standby state for next usage.

As described above, inserting a hard disk and removing the hard disk are primary operations of the hard disk adapter in accordance with the present invention. The hard disk adapter in accordance with the present invention may further comprise a contact (80) attached to the external surface of the holder (61) and abutting a rear end of the slider (62). When the switch (70) is pressed and forces the slider (62) to slide rearwards and hit the contact (80), the contact (80) returns a tactual feedback to the user through the slider (62) and the switch (70). By feeling the tactual feedback, the user will clearly and surely confirm that the switch (70) has been pressed to a proper extent and releases the switch (70).

With further reference to FIG. 2, the contact (80) may comprise a contact member (81), a contact resilient element (82) and a contact protrusion (83). The contact resilient element is mounted within the contact member (81). The contact protrusion (83) is pushed by the contact resilient element and protrudes out from the contact member (81) towards the rear end of the slider (62). The slider (62) slides rearwards and hits the contact protrusion (83), the hard disk is nearly released from the fastening protrusion. By continuing pressing the switch (70) and forcing the slider (62) to slide rearwards, the contact protrusion (83) pushed by the contact resilient element provides an increasing feedback force to the slider (62). The user detecting the tactual feedback will be aware of the coming release of the hard disk and tends to operate the hard disk adapter in accordance with the present invention more carefully.

After the hard disk is removed, the contact (80) pushes the slider (62) together with the aforementioned resilient element (64) and allows the switch (70) to return to a standby state, which provides improved convenience.

The fastening device (60) may further comprise an upper stop (65) and a lower stop (66). The upper stop (65) is attached to the external surface of the holder (61) above the fastening hole (611) for limiting the slider (62). The lower stop (66) is attached to the external surface of the holder (61) below the fastening hole (611) for limiting the slider (62). Limited by the upper stop (65) and the lower stop (66), the slider (62) slides more smooth without wobbling.

To allow the fastening member (63) to slide more smoothly, the rear stop (613) may comprise a fore surface and a rail (614) while the fastening member (63) may further comprise a rib (634). The fore surface of the rear stop (613) faces the fore stop (612). The rail (614) is attached to the fore surface of the rear stop (613). The rib (634) fits to the rail (614).

With the above-described structure, the hard disk adapter is capable of conveniently connecting a hard disk and providing an available connection for an eSATA peripheral.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A hard disk adapter comprising
a body comprising
   a panel; and
   a receiving space;
a connector attached to the body and located in the receiving space;
an opening formed on the panel and communicating with the receiving space;
a plug-in slot formed on the panel beside the opening; and
an eSATA connector comprising
   a receiving end mounted to the plug-in slot; and
   a connecting end,
a fastening device attached to the body for fastening a hard disk in the receiving space; and
a switch operably mounted on the panel for controlling the fastening device,
wherein the fastening device comprises
a holder comprising
a fore end pointing to the panel;
a rear end pointing away from the panel;
a top edge;
a bottom edge;
an external surface; and
an internal surface facing the receiving space;
a fastening hole formed on the holder and communicating with the receiving space;
a fore stop attached to the external surface of the holder ahead the fastening hole;
a rear stop attached to the external surface of the holder behind the fastening hole;
a slider back-and-forth slidably mounted to the external surface of the holder;
a mounting slot formed in the slider, mounted around the fore stop and the rear stop and comprising a slot wall;
at least one oblique slot formed in the slot wall of the mounting slot along a direction of rear-internal to fore-external and located between the fore stop and the rear stop;

a fastening member in-and-out slidably mounted between the fore stop and the rear stop and comprising a inner surface facing the fastening hole;

a fastening protrusion attached to the inner surface of the fastening member and selectively inserted in the fastening hole from the external surface to the internal surface of the holder and comprising a distal end;

a fastening slope formed on the distal end of the fastening protrusion and facing the opening; and at least one cylinder formed on the fastening member and slidably mounted in the at least one oblique slot respectively; and the switch is a button extending from the slider and protruding forwards from the panel operably defined on the panel for controlling the fastening device.

2. The hard disk adapter as claimed in claim 1, wherein the fastening device further comprises a resilient element mounted between the fore stop and the slot wall of the mounting slot for pushing the slider forwards.

3. The hard disk adapter as claimed in claim 2, wherein the resilient element is a spring.

4. The hard disk adapter as claimed in claim 1, wherein the fastening device further comprises an upper stop attached to the external surface of the holder above the fastening hole for limiting the slider; and a lower stop attached to the external surface of the holder below the fastening hole for limiting the slider.

5. The hard disk adapter as claimed in claim 1, wherein the rear stop comprises a fore surface facing the fore stop; and a rail attached to the fore surface of the rear stop for smoothen a sliding motion of the fastening member; and the fastening member further comprises a rib fitting to the rail.

6. The hard disk adapter as claimed in claim 4, wherein the rear stop comprises a fore surface facing the fore stop; and the hard disk adapter further comprises a rail attached to the fore surface of the rear stop for smoothening a sliding motion of the fastening member.

7. The hard disk adapter as claimed in claim 1, further comprising a contact attached to the external surface of the holder and abutting a rear end of the slider.

8. The hard disk adapter as claimed in claim 7, wherein the contact comprises a contact member;

a contact resilient element mounted within the contact member; and a contact protrusion pushed by the contact resilient element and protruding out from the contact member towards the rear end of the slider.

* * * * *